United States Patent
Cothren et al.

[11] Patent Number: 6,154,560
[45] Date of Patent: Nov. 28, 2000

[54] SYSTEM AND METHOD FOR STAGING REGIONAL LYMPH NODES USING QUANTITATIVE ANALYSIS OF ENDOSCOPIC ULTRASOUND IMAGES

[75] Inventors: Robert M. Cothren, Cleveland Heights, Ohio; Alexandre Purper Brandao, San Francisco, Calif.; Gregory Zuccaro, Jr., Westlake, Ohio

[73] Assignee: The Cleveland Clinic Foundation, Cleveland, Ohio

[21] Appl. No.: 08/706,421

[22] Filed: Aug. 30, 1996

[51] Int. Cl.[7] .................................................. G06K 9/00
[52] U.S. Cl. ............................................ 382/128; 600/437
[58] Field of Search ..................... 128/915, 916, 128/660.01, 662.06, 922; 382/108, 128–134, 203, 204; 395/118, 129, 130; 600/437, 443, 463; 250/461.2

[56] References Cited

U.S. PATENT DOCUMENTS

| | | | |
|---|---|---|---|
| 5,282,472 | 2/1994 | Companion et al. | 600/463 |
| 5,339,815 | 8/1994 | Liu et al. | 600/437 |
| 5,426,684 | 6/1995 | Gaborski et al. | 378/62 |
| 5,638,820 | 6/1997 | Chen et al. | 600/437 |
| 5,644,232 | 7/1997 | Smith | 324/309 |
| 5,818,231 | 10/1998 | Smith | 324/309 |

OTHER PUBLICATIONS

Nishino, F., Differential Diagnosis of Lymph Nodes in Oral–Maxillary Regions by Ultrasonography, Nichidai Koko Kagaku, 16(4), p. 417–28, Dec. 1990.

Choi et al., Texture Analysis as a Method for Describing Disorder in Histological Tissue Sections, Proceedings of the 8th Scandinavian Conference on Image Analysis, vol. 2 of 2 vol., p. 839–45, May 1990.

Brandoa, Alexandre Purper, B.S., *Staging of Lymph Nodes in Esophageal Carcinoma Using Endoscopic Ultrasound and Image Processing, A Thesis*, The Ohio State University (1996).

Hillman, B.J. et al., "Echographic Characteristics of Malignant Lymph Nodes", Journal of Clinical Ultrasound, vol. 8, issue 3, Jun. 1980Hillman, B.J. et al., "Echographic Characteristrics of Maligant Lymph Nodes", Journal of Clinical Ultrasound, vol. 8, i.

Savides, T.J., Endoscopic Ultrasound, Hospital Practice, vol. 31, issue 6, p. 107–8, Jun. 1996.

Lu et al., Ultrasonographic Findings of Papillary Thyroid Carcinoma and their Relation to Pathologic Changes, Journal of the Formosan Medical Association, vol. 93, No. 11/12, p. 933–8, Nov. 1994.

Nishino, Differential Diagnosis of Lymph Nodes in Oral–Maxillary Regions by Ultrasonography, Nihon Univ. J. Oral Sci., 16:417–428, 1990.

Hillman et al., "Echographics Characteristics of Malignant Lymph Nodes", Journal of Clinical Ultrasound, Jun. 1980, pp. 213–215.

Schwerk et al., "Testicular Tumors:Prospective Analysis of Real–Time US patterns and Abdonimal Staging", Radiology, Feb., 1987, pp. 369–374.

*Primary Examiner*—Jon Chang
*Assistant Examiner*—Jayanti K Patel
*Attorney, Agent, or Firm*—Calfee, Halter & Griswold LLP

[57] ABSTRACT

A system and method for automatically staging regional lymph nodes under the TNM classification system using textural analyses of endoscopic ultrasound images. N stage for a lymph node is determined by analyzing the organization of the texture of a region corresponding to the node on a digitized ultrasound image. Specifically, Haralick's difference entropy and correlation textural features are calculated and compared to predetermined reference values to predict whether the lymph node is benign or malignant. Also, the cross-sectional area of the node is determined and used to make an N staging determination. An application of the present invention is staging of esophageal lymph nodes in the diagnosis and treatment of esophageal carcinoma using endoscopic ultrasound images.

30 Claims, 5 Drawing Sheets

SYSTEM AND METHOD FOR STAGING REGIONAL LYMPH NODES USING QUANTITATIVE ANALYSIS OF ENDOSCOPIC ULTRASOUND IMAGES

FIELD OF THE INVENTION

The present invention relates generally to medical diagnostic instruments and, more specifically, to a system and method of staging lymph nodes using quantitative analyses of ultrasound images of the lymph nodes.

BACKGROUND OF THE INVENTION

Carcinoma of the esophagus is a disease that has poor overall prognosis, with 1-year and 5-year survival rates of approximately 18% and 6%, respectively. The diagnosis of esophageal carcinoma is usually obtained using endoscopy with biopsy and brush cytology. Once the diagnosis is established, the patient typically undergoes clinical staging to determine the depth of penetration of the lesion and to determine the extent of lymph node metastasis. If there are no signs of tumor penetration beyond the esophageal wall and no signs of lymph node involvement, the patient should be considered potentially curable and undergo surgical resection. On the other hand, if there is involvement of lymph nodes or penetration beyond the esophageal wall, treatment alternatives such as radiotherapy and chemotherapy may take place, possibly followed by an attempt at surgical resection. Thus, staging is critical in determined a course of treatment.

Endoscopic ultrasound (EUS) is a relatively recent imaging modality that is being successfully used in tumor staging of esophageal carcinoma. It combines the proximity to the gastrointestinal (GI) wall provided by endoscopic imaging with the detailed morphological information provided by ultrasound imaging.

Tumor staging using EUS is done through the well known TNM classification system, which classifies esophageal carcinoma using stages of the primary tumor, regional lymph node involvement, and distant metastasis. Since 1987, clinical staging of esophageal carcinoma has been done according to this TNM system. In the TNM system, the evaluation of the primary tumor (T stage) only considers depth of penetration into the esophageal wall. Anatomic location and length of tumor are no longer considered relevant. Evaluation of regional lymph nodes (N stage) is based solely on the presence or absence of metastatic carcinoma. Anatomic site once again is no longer of importance. Distant metastasis (M stage) indicates involvement of tissues outside of the immediate area of the primary tumor including celiac axis lymph nodes. As known to those skilled in the art, in the TNM system the stages for regional lymph nodes are as follows: NX indicates that regional lymph nodes cannot be assessed, N0 indicates that no regional lymph node metastasis was detected, and N1 indicates that regional lymph node metastasis was detected.

It is generally accepted that EUS is most accurate at determining T stage, which is the depth of penetration through the esophageal wall. The performance of EUS at T staging is regarded as being superior to that of computed tomography (CT). Because of many factors, not the least of which is the subjective nature of prior art methods of using EUS to determine lymph node involvement, EUS is considered to be somewhat less accurate at determining N stage, which reflects the status of regional lymph nodes. The overall accuracy in determining N stage is in the range of 70–80%. This accuracy, however, is achieved based on N staging of cases (patients), rather than N staging of individual lymph nodes, which is preferable. There is little understanding about the changes that may occur to sonographic characteristics of lymph nodes once they are affected by tumor. Additionally, the established EUS criteria for evaluating lymph nodes have not been rigorously evaluated. Nevertheless, the performance of EUS in N staging is still generally considered to be more reliable than that of CT and MRI. Finally, EUS is considered to be inappropriate for assessment of M stage, which is related to distant metastasis, because common sites such as the liver and the celiac axis are not properly observed with the endoscope; most of the liver is not well seen, and the celiac axis is not appreciated in every case.

The importance of staging in general, and N staging in particular, is better understood when considering that only depth of tumor penetration and lymph node status have major impact on patient survival rate. Studies have shown that factors that affected patient prognosis included: the depth of penetration of the tumor through the esophageal wall and the presence of lymph node involvement. Thus, clinical N staging plays a relevant role in predicting prognosis. A variety of treatments such as surgical resection, radiotherapy, chemotherapy, or any combination thereof can be used in cases of esophageal carcinoma; however, the selection of treatment is directed to a large degree by the TNM stage of the carcinoma. Accurate clinical staging, therefore, is an important guide in determining therapy for those with esophageal carcinoma.

As important as EUS staging of regional lymph nodes is, there are several important problems with prior art methods of determining N stage using EUS. First of all, EUS characteristics are evaluated qualitatively; their measures essentially reflect what the endoscopists can see on the EUS display or printout. Thus, EUS staging determinations are clearly dependent on the perception of the observer, being subject to both intra- and interobserver variabilities.

Moreover, there is a lot of controversy regarding which node features are predictive of N stage. The strategy for N staging using EUS is not standardized. There is no consensus if size alone is a good predictor of lymph node malignancy. Emphasis on lymph node characteristics such as echopattern, size, and shape may vary among individual endoscopists. One criterion often used is that lymph nodes larger than one centimeter are considered to be malignant. Also, there is a trend among different investigators to consider round and hypoechoic (dark) nodes as malignant, and ellipsoid and hyperechoic (bright) nodes as benign. Regular borders (little jaggedness) is an EUS characteristic often attributed to malignant nodes. Again, these characteristics are heavily dependent on what the endoscopist sees. The only measurements that can be labeled quantitative to a certain degree is size, and in some studies, circularity. Both measurements take advantage of the capability provided by EUS equipment which allows the measurement of dimension along a line placed by the operator on the display monitor. Size is then measured as the maximum length within lymph node borders. When measured, circularity is obtained by the ratio of the maximum length to the length perpendicular to it. Still, even these seemingly more quantitative measurements are highly dependent on the observer. Even more importantly, very little evidence exists establishing that some or any of these perceived criteria are actually indicators of the presence or absence of lymph node metastasis.

Thus, there is a need for a quantitative system and method for determining involvement of regional lymph nodes using endoscopic ultrasound in staging esophageal carcinoma.

SUMMARY OF THE INVENTION

According to the present invention, a system and method of staging lymph nodes is provided. The system and method of the present invention evaluates the stage of a lymph node by performing an analysis of a matrix of position-correlated signals of a predetermined parameter of tissue including a regional lymph node. In the case of a typical two-dimensional endoscopic ultrasound, the matrix of position-correlated signals of a predetermined parameter of tissue comprises a digitized ultrasound image of a slice of tissue including a regional lymph node. An analysis of the portion of the image corresponding to the lymph node generates one or more numerical values that are used to determine the stage of the lymph node. The preferred feature to be analyzed according to the present invention is the organization of the texture of the node, which can include the uniformity of the texture of the node. In addition to a textural analysis, the present invention uses a quantitative analysis of other characteristics of the node, including the determination of a size value related to the size of the node. The preferred analysis of the present invention includes a determination of one or more of the following numeric values: a difference entropy value related to a difference entropy textural feature of the node, a correlation value related to a correlation textural feature of the node, and an area value related to the cross-sectional area of the node.

It is therefore an advantage of the present invention to provide a system and method for quantitative determination of N stage classification of a regional lymph node.

It is a further advantage of this invention to provide a system and method for real-time determination of N stage for a regional lymph node using a textural analysis of a matrix of position-correlated signals of a predetermined parameter of tissue including the regional lymph node.

It is another advantage of this invention to provide a system and method for real-time determination of N stage for a regional lymph node using a textural analysis of an ultrasound image of the regional lymph node.

It is still another advantage of this invention to provide a system and method for real-time determination of N stage for a regional lymph node using a quantitative analysis of the area of a node in an ultrasound image.

It is yet another advantage of the present invention to provide a system and method of post-processing ultrasound image data of regional lymph nodes to determine N stage for the regional lymph nodes.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description that follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
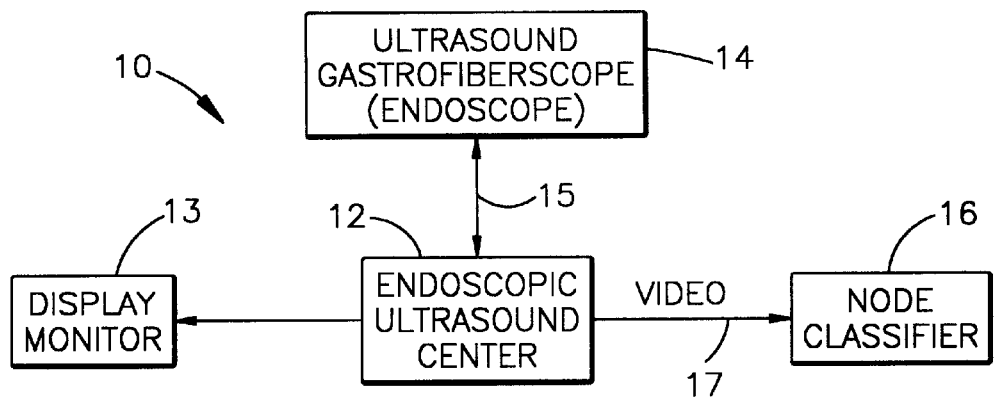
FIG. 1 is a high-level block diagram of one embodiment of a node classifier system according to the present invention.

Referring now more particularly to the accompanying drawings, a system embodying the present invention is there shown and generally indicated at 10 (FIG. 1). The system 10 includes an endoscopic ultrasound center 12 having an associated display monitor 13. Three suitable ultrasound centers for the center 12 are endoscopic ultrasound center models EU-M2, EU-M3 and EU-M20, which are manufactured by Olympus Corp. and available through common sources. The ultrasound center 12 is connected to an ultrasound gastrofiberscope (endoscope) 14 via an endoscope communications link 15 and further connected to a node classifier 16 via a video image communications link 17. Two suitable endoscopes for the endoscope 14 are models GF-UM3 and GF-UM20 gastrofiberscopes, which are also manufactured by Olympus Corp. and available through common sources. The ultrasound center 12 transmits an electrical video signal (corresponding to the ultrasound image displayed on the display monitor 13) to the node classifier 16 along the video image communications link 17. The node classifier 16 is a subject of the present invention and is described in more detail herein.

Figure 2:
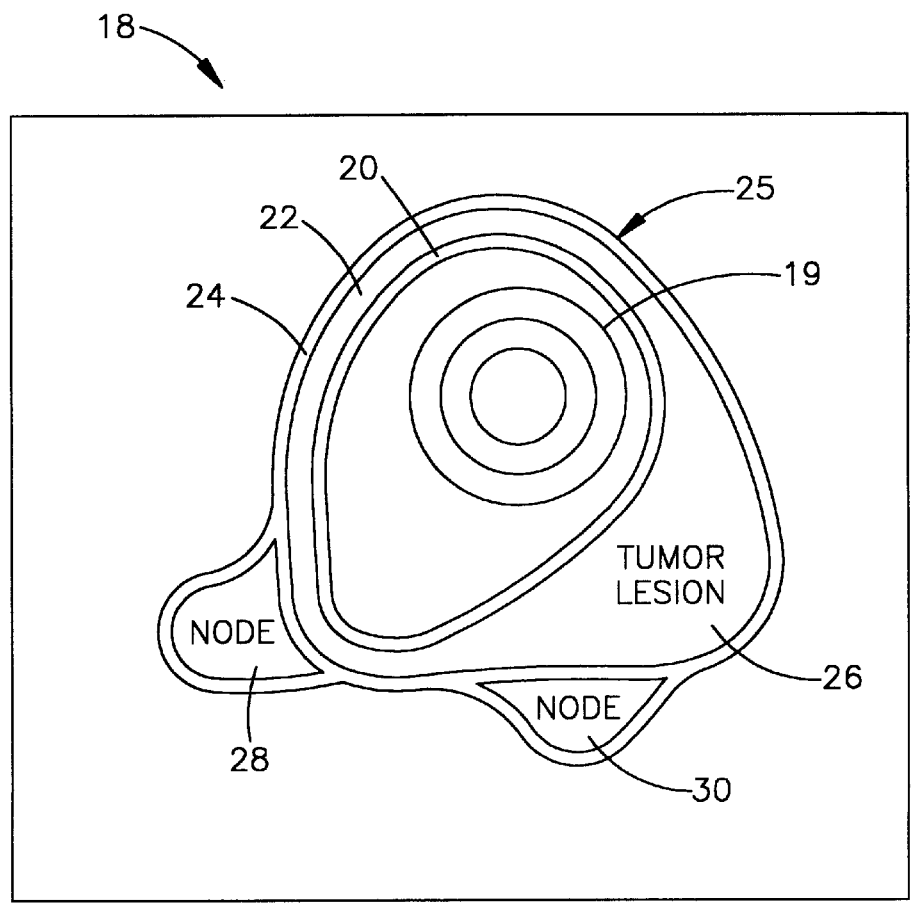
FIG. 2 is a schematic line drawing of an exemplary ultrasound image of an esophageal carcinoma and associated lymph nodes for analysis by the present invention.

Referring now to FIG. 2, a line drawing corresponding to an ultrasound slice 18 is shown. Concentric circles, indicated generally by reference character 19, are an artifact surrounding the location of the endoscope and are commonly displayed in the ultrasound image. The slice 18 shows three layers 20, 22, and 24 corresponding to the esophageal wall 25. As known to those skilled in the art, as seen on an actual ultrasound image, the inner layer 20 is relatively hyperechoic (bright), the middle layer 22 is relatively hypoechoic (dark), and the outer layer 24 is relatively hyperechoic. The inner layer 20 corresponds to (i) a water-filled balloon (not shown) that typically surrounds the tip of the endoscope 14, (ii) the mucosa, (iii) the muscularis mucosa, (iv) the submucosa, and (v) the ultrasound interface between the submucosa and muscularis propria. The middle layer 22 corresponds to the muscularis propria. The third layer 24 corresponds to the interface between the niuscularis propria and the surrounding tissue. In the ultrasound image of FIG. 2, the esophageal wall 25 presents a thickening corresponding to a tumor lesion 26. Regional lymph nodes 28, 30 are also seen. As known to those in the art, the tumor lesion and nodes 28, 30 are relatively hypoechoic on actual ultrasound images.

Figure 3:
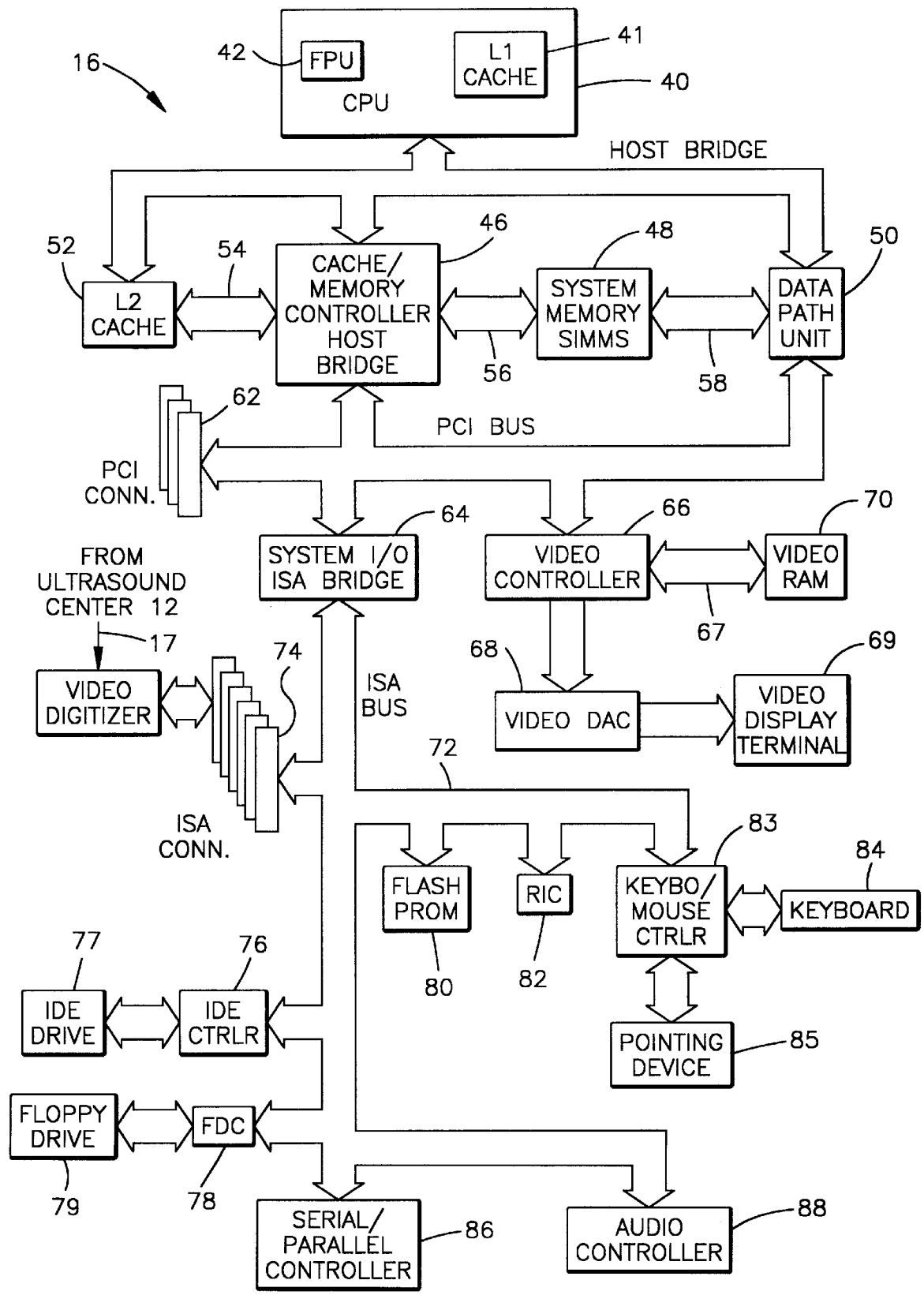
FIG. 3 is a block diagram of one embodiment of a node classifier according to the present invention.

Referring now to FIG. 3, a block diagram of a node classifier 16 according to the present invention is shown.

The node classifier 16 preferably includes a system processing unit 40 having an integral cache memory 41 and an integral floating point coprocessor (FPU) 42. While any appropriate microprocessor, digital signal processor, central processing unit (CPU), distributed processing unit, CISC, RISC, trained artificial neural network, fuzzy logic processor, or other digital or analog processor can be used as the processing unit 40, suitable central processing units (CPUs) include the Intel PENTIUM® and the IBM POWER PC. The suitability of processors as the processing unit 40 depends primarily on whether the candidate processor has sufficient processing power to perform the size, shape, intensity (e.g., statistical), and textural analyses and comparisons required in the practice of the present invention. The processing unit 40 is connected by a high speed CPU host bus 44 to a cache/memory controller and host bridge 46, data path unit 50, and second level cache memory (L2 cache) 52.

The cache/memory controller and host bridge 46 is connected to the L2 cache 52 via a bus 54 and to a system memory 48 via a memory bus 56. The cache/memory controller and host bridge 46 integrates the L2 cache 52 and system memory 48 control functions and provides address paths and bus controls for transfers between the Host (processing unit 40), system memory 48, and a Peripheral Component Interconnect (PCI) bus 60. The PCI bus 60 employs a 32 bit data bus that supports multiple peripheral components and add-in cards at a peak bandwidth of 132 MB/second. During bus operations between the processing unit 40, system memory 48 and PCI bus 60, the cache/memory controller 46 provides the address paths and bus controls. The cache/memory controller 46 also controls data flow through the data path unit 50.

The data path unit 50 provides data path connections between the processing unit 40, system memory 48, and PCI bus 60. The system memory 48 is interfaced to the data path unit 50 via a data bus 58 whereby data is transmitted into and out of the system memory 48 to the rest of the system. The cache/memory controller 46 and the data path unit 50 provide a full function data path connection to system memory 48 and from PCI bus 60 to a Host subsystem (such as processing unit 40). The PCI bus 60 is further connected to a plurality of PCI bus expansion slots 62 (three slots are shown), system I/O bridge controller 64, and video controller 66. The system I/O bridge controller 64 provides a bridge between the PCI bus 60 and an ISA bus 72 (or other peripheral bus; not shown) and integrates many of the common I/O functions found in ISA-based PC systems. The video controller 66, which is associated with a video RAM 70 for storing graphic information via a bus 67, is interfaced to the PCI Bus 60 to allow large amounts of data required for high performance graphics to be transmitted quickly to the video controller 66. Video signals generated by video controller 66 may be passed through a Digital to Analog Converter (DAC) 68 to a video display terminal 69 or other display device.

Various peripheral devices are typically connected to the ISA bus 73, such as ISA expansion slots 74 (6 are shown), an IDE hard disk controller 76 that interfaces to an IDE hard disk drive 77, a floppy disk controller (FDC) 78 that interfaces to a floppy disk drive 79, a flash PROM (BIOS) 80, real time clock 82, keyboard/mouse controller 83 that interfaces to a keyboard 84 and a pointing device 85 (such as a track ball, "mouse," glide point, separate cursor movement keys, or digitizing tablet having an associated "puck"), a serial/parallel controller 86, and optionally, an audio controller 88. In the alternative, these devices can be connected to the processing unit 40 via the PCI bus 60 or some other peripheral bus. The components of FIG. 3 described above are available from numerous sources, as known to those skilled in the art. While the above description has been described with some particularity, it is to be understood that the present invention may be used in conjunction with other hardware configurations. For example, other peripheral components may be added to PCI bus 60. As another example, higher end systems such as dedicated UNIX workstations from Sun and other manufacturers can be used in the alternative to the components of FIG. 3 described above.

The node classifier 16 according to the present invention also includes a video digitizer 90, which is also known in the art as a "frame grabber." One suitable video digitizer is frame grabber model DT-3852 produced by Data Translation Inc., which can capture black and white ultrasound images (current ultrasound images are typically black and white) at 640 by 480 pixels in 256 shades of gray. The video digitizer 90 is in circuit communication with the processing unit 40 via an ISA bus connector 74, a PCI bus connector 62, or other suitable path, such as via a parallel port generated by the serial/parallel controller 86. The video digitizer 90 continuously receives the video ultrasound image signal from the ultrasound center 12 via the video image communications link 17. Responsive to a command from the processing unit 40, the video digitizer 90 digitizes one frame of the ultrasound image after performing any necessary synchronization. The resulting digitized ultrasound image is thereafter available for analysis and manipulation by the processing unit 40.

The exemplary hardware described herein provides a suitable structure for the remainder of the present invention; however, other hardware platforms might also be suitable. What is important is that the node classifier of the present invention receive computer-readable, position-correlated signals of a predetermined parameter of tissue including a lymph node. For example, many of the benefits of the present invention can be realized by execution of the routines of FIGS. 4 on a different general purpose computer using prerecorded data, which can optionally also be previously digitized data (e.g., digitized ultrasound images), stored in an appropriate medium, such as a VCR cassette, a flexible diskette, a hard diskette, a CD-ROM, or the like. Such a general purpose computer system would then become a specific purpose computer system with the execution of those routines on the node data. Thus, the present invention can be embodied in a computer-readable computer program product comprising a computer readable medium having computer program logic recorded thereon (also known as a computer-readable medium of instructions), such as a flexible diskette, hard diskette, CD-ROM, or the like, having the routines of FIG. 4 stored thereon in executable, compilable, linkable, or translatable form.

An alternative embodiment of the present invention includes embedding the node classification circuitry directly into the ultrasound center 12. A typical ultrasound system includes an ultrasound center 12 and its associated peripheral devices, such as an endoscopic probe 14, a control panel having an integral or separate pointing device, a display monitor 13, foot switches, infrared controls, etc. Such ultrasound systems already have (a) a display monitor, (b) circuitry to generate an electrical signal corresponding to a visual image of an ultrasound image, (c) a pointing device, and (d) other control devices, such as a keyboard. Additionally, these systems might also have a processing unit and access to digital ultrasound image data. If the processor (not shown) of such ultrasound centers have sufficient remaining processing power (after performing all of the tasks necessary for operation of the ultrasound system), then the routines of the present invention (FIG. 4 and accompanying text) might be implemented on the existing hardware of that system, i.e., added to the code executing on that processor. On the other hand, if the ultrasound system does not have a processor with sufficient remaining processing power (or sufficient memory, etc.), then a subset of the components of FIG. 3 can be added to the circuitry of the ultrasound center 12 to implement the present invention in that center. For example, a processing unit 40, a system memory 48, a cache memory 52, a ROM 80 (having the routines of FIG. 4 and accompanying text therein), and any associated buffers, clocks, control circuits, etc. could be added to the center 12 in a manner known to those skilled in the art to provide the node classification functionality of the present invention. Such a subset of circuitry might connect to (a) a control section of the system, which is responsible for interfacing the pointing device and other controls, and (b) a digital data section, which is responsible for generating the video signal and which has access to ultrasound images already in digital form (or analog form if the added processor 40 uses analog data). If the ultrasound system does not make use of digital ultrasound images internally, then a video digitizer 90 can be added to the subset of required added components to provide digital ultrasound images to the processing unit 40.

Figure 4:
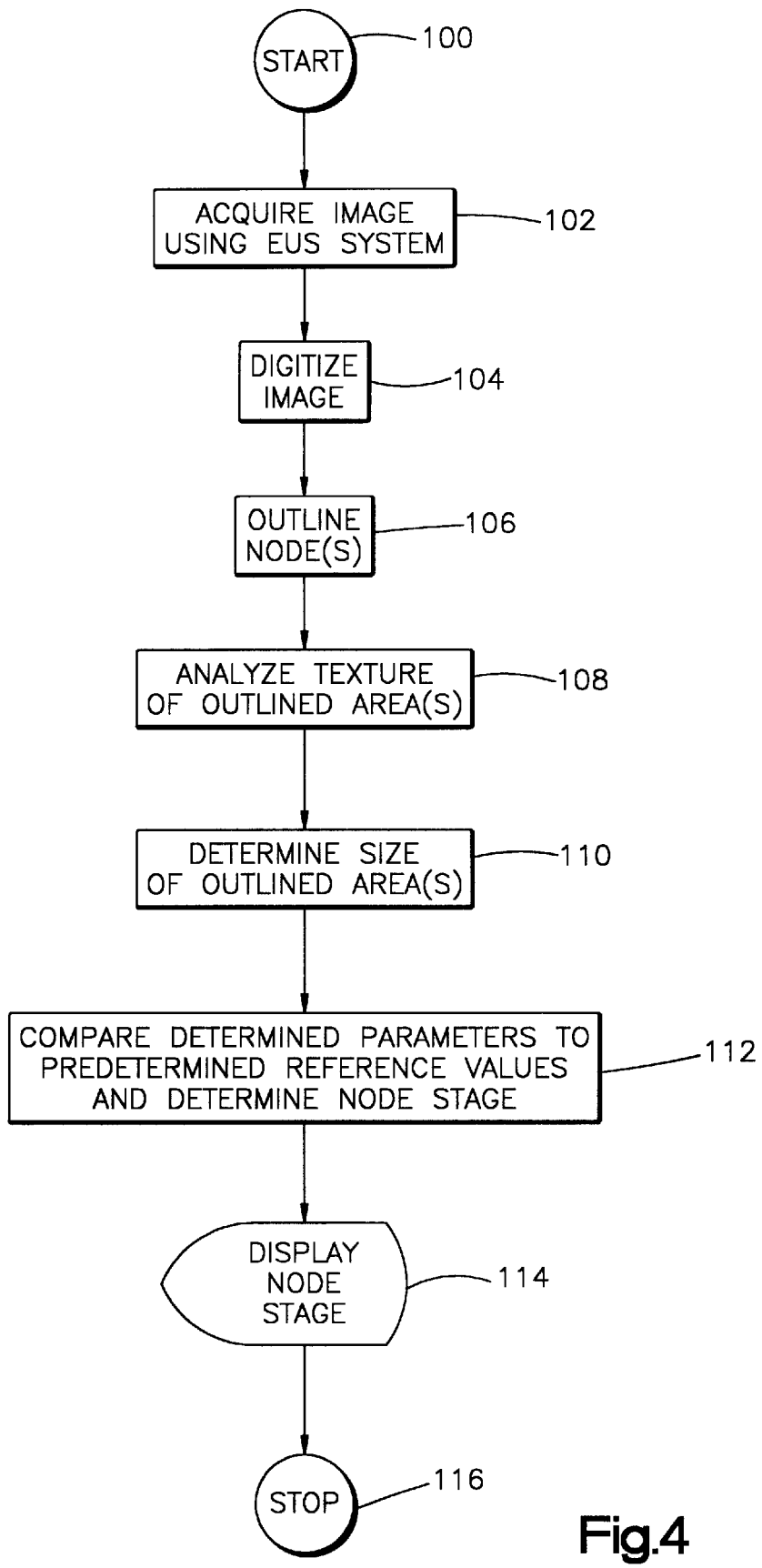
FIG. 4 is a flow chart showing the routines for classifying a node according to the present invention.

Referring now to FIG. 4, a flow chart showing the flow of node staging according to the present invention is presented. The routines of FIG. 4 can be performed on the system described in connection with FIG. 3, on another comparable general purpose system, or in other circuitry specifically designed to determine the N stage from EUS data, such as the embedded embodiments outlined above.

After starting at task 100, an ultrasound image is acquired and frozen at task 102 with the scope 14 and the center 12 in the usual manner. Using an Olympus model EU-M2(or EU-M3 or EU-M20) ultrasound center and an Olympus model GF-UM3 (or GF-UM20) endoscope, images are collected using the following parameters: a frequency of 12 MHz, a contrast of 5, a gain of 8, and a range of 9 cm. It should be understood that a frequency of 7.5 MHz was also tested and was also found to be useful. The imaging distance to the node was not included as part of the imaging protocol because this condition is difficult to control. However, most of the digitized image frames had the nodes at about 2–3 cm from the transducer. This range of distances matches the depth of focus of the ultrasound transducer at 12 MHz. Thus, it might be necessary to keep the nodes at about 2–3 cm from the transducer also. Task 102, in essence, is the acquisition of position-correlated signals of a predetermined parameter of tissue including a lymph node. The particular acquisition parameters for other specific diagnostic instruments can be determined without undue experimentation by those of ordinary skill in the art. Clearly the endoscopist must select an image that has relevant features, i.e., an image with at least one lymph node, preferably an image including the largest cross sectional slice of the lymph node. Once the endoscopist locates a desired image, the endoscopist "freezes" that image in the usual manner using a control on the ultrasound center 12. As known to those in the art, the ultrasound center 12 displays the frozen ultrasound image on the display 13 and transmits an electrical video signal corresponding to the frozen ultrasound image via the video image communications link 17 to the node classifier 16.

At 104 the ultrasound image is digitized using the video digitizer 90. Once the endoscopist has acquired and frozen the ultrasound image, the endoscopist actuates a control on the node classifier, e.g., a particular key on the keyboard 84, thereby causing the processing unit 40 to cause the video digitizer 90 to transform the analog video signal into a digital ultrasound image. In the case of a two-dimensional black and white ultrasound image, the video digitizer generates a two-dimensional matrix of digitized gray scale values. If the video signal transmitted via the video image communications link 17 is black and white, then it is sufficient to digitize the image into 640 by 480 pixels at 256 shades of gray. Other diagnostic instruments might require digitization into a matrix of digital color values (e.g., 24-bit color values) or might lend themselves to digitization into a three-dimensional matrix of digital parameter data (e.g., a series of position-correlated slices of data) or might lend themselves to digitization into an image larger than 640 by 480 pixels to allow a higher-resolution analysis. Once digitized, the digital image data is transferred to the system memory 48 using common methods such as block moves by the processing unit 40 or by direct memory access (DMA) block transfers. Additionally, a file corresponding to the digital image can be saved to the hard disk drive 77 or to a floppy diskette via the floppy drive 79. It is also advantageous to contemporaneously display the digitized image on the video display terminal 69 using the video subsystem (video controller 66, video DAC 68, and video RAM 70) of the node classifier 16. As with the transfer to system memory 48, the digital image can be transferred to the video RAM 70 by the processing unit 40 or by DMA block transfers or by other means of moving blocks of data.

Although the image is preferably digitized by the node classifier immediately after being frozen by the endoscopist, the image need not be digitized immediately. In the alternative, the video signal transmitted via the video image communications link 17 can be recorded onto a tangible medium and stored for later analysis. One video cassette recorder (VCR) that is suitable to store analog ultrasound images is a U-matic VCR model VO-5600 produced by Sony Inc. In this case, the video image communications link 17 from the ultrasound center 12 is connected to the input of the VCR (not shown) and the video output of that VCR or another VCR is connected to the input of the video digitizer 90. In this alternative configuration, the images are played back via the VCR and digitized by the video digitizer 90.

Figure 5A:
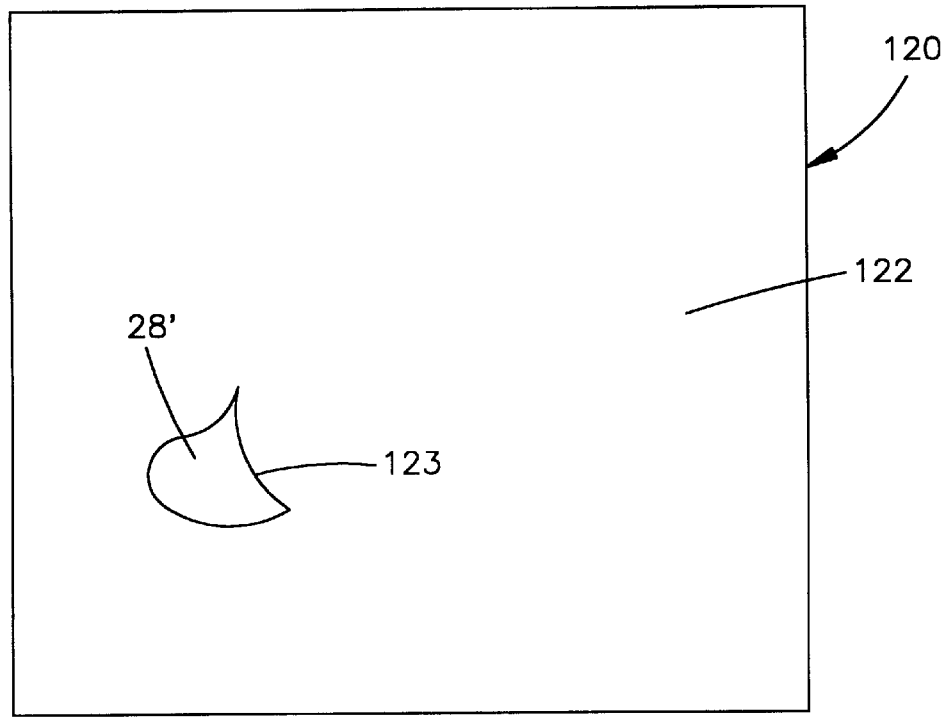
FIGS. 5A and 5B are line drawings of exemplary outline binary images showing outlined node regions.
Figure 5B:
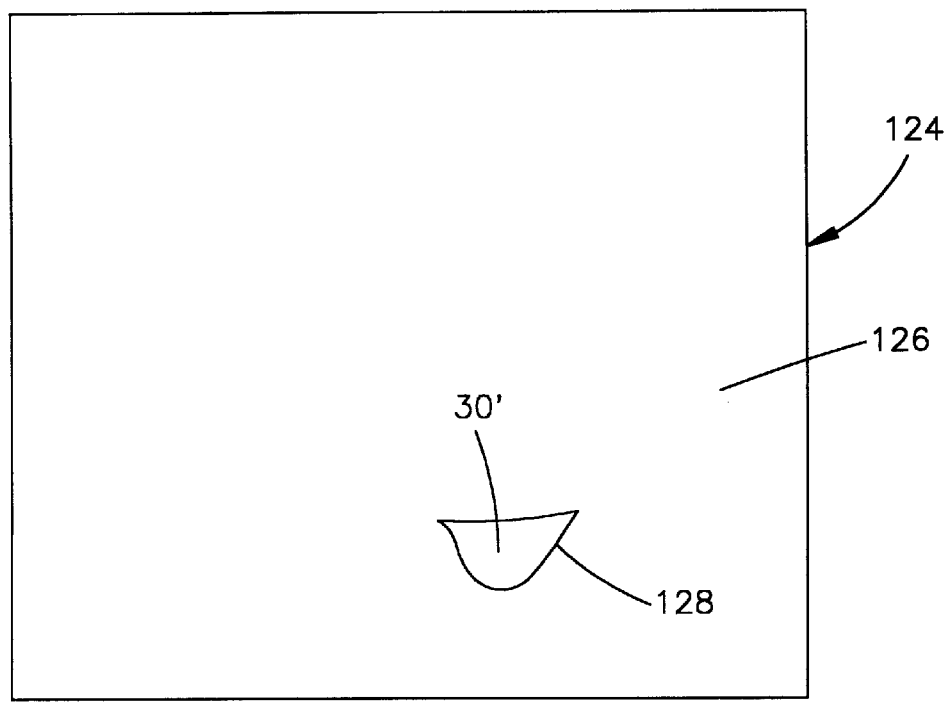

Next, the node(s) in the digital image are outlined at task 106. During the outline process, a region of the digital image corresponding to a single node is defined. The result of the outlining step, e.g., the output of a tracing routine, is an outline data file that is a binary image in which only outline and/or area points of the object (e.g., lymph node) have a different gray level value from that of background points. The binary image is the same overall size as the digitized ultrasound image, e.g., 640 by 480 pixels, or otherwise positionally correlated to the digitized ultrasound image so as to be usable as a mask. FIGS. 5A and 5B represent two example outline binary images 120, 124 that correspond to the digital image of the slice 18 in FIG. 2. There is one outline binary image 120 for the node 28 and one outline binary image 124 for the node 30. Regions 28' and 30' defined by outlines 123 and 128 of FIGS. 5A and 5B correspond to nodes 28 and 30, respectively, in FIG. 2. Binary images 120, 124 are the same size as the digital ultrasound image. All the pixels in the background area 122 of the binary image of FIG. 5A are set to one binary value (e.g., a logical ZERO). All the pixels in the region 28' including the pixels defining the outline 123 are set to another binary value (e.g., a logical ONE). Likewise, all the pixels in the background area 126 of the binary image of FIG. 5B are set to one binary value and all the pixels in the region 30' and the pixels defining the outline 128 are set to another binary value. These binary images 120, 124 are stored to a tangible medium using common means.

The nodes can be outlined either automatically or by an endoscopist or experienced outliner using a tracing program. In both cases, the digital ultrasound image is first displayed on the video display terminal 69. In the case of automatic outlining, the endoscopist uses the pointing device 85 to place a cursor (not shown) within the region corresponding to a node and generally near the center of the node. With the cursor on the node and generally in its center, the endoscopist activates the automatic outlining program by actuating a control, e.g., a key of keyboard 84, a button on a mouse, a button on a track ball base, a button on a digitizing tablet "puck," or a "double click" on a glide point surface, etc. For example, the endoscopist might place the cursor on the node 28 where the "e" in "node" is in FIG. 2 and press a mouse button. Once actuated, the automatic outlining program outlines the node 28 using any of a number of common outlining algorithms, e.g., "region growing," or an edge-detection algorithm using e.g., two-dimensional gradient analysis or active contours, to detect edges of objects. The outlined region is displayed on the video display terminal 69. Once the region has been automatically outlined, the endoscopist is given a choice to either accept or reject the automatically outlined region by actuating a particular control, e.g., a control on the pointing device 85 or a key on the keyboard 84. If the region is accepted, the binary image file is optionally saved to the hard disk drive 77 or to a floppy diskette via the floppy drive 79. If the region is rejected, the endoscopist can either make another attempt at an automatic outlining, as described above, possibly using a different algorithm, or perform a manual outlining, described below. Also, a completely automatic outlining method without any intervention from the endoscopist might be used.

In the case of manual outlining, the endoscopist outlines the nodes using the cursor of the pointing device 85 to trace the outline of the node over the displayed digital image. The result is the binary digital image described above. To trace the outline, the endoscopist moves the pointing device to position the cursor at an edge of a node, actuates a control on the pointing device to begin the manual tracing program, traces the outline of the node, and re-actuates (or ceases actuating) the control on the pointing device to end the tracing program. During the tracing, logic (either executable code or circuitry) in circuit communication with the processing unit 40 uses positional data from the pointing device 85 and correlates the position of the cursor with respect to the digital image to create an pixel-based outline of the node, e.g., outlines 123, 128. Having manually determined the pixels corresponding to closed outline of the node 123, 128, the tracing program can easily fill the entire region corresponding to the node, e.g., regions 28', 30', using common algorithms. As with automatic outlining, once the region has been manually outlined, the endoscopist is given a choice to either accept or reject the manually outlined region by actuating a particular control, e.g., a control on the pointing device 85 or a key on the keyboard 84. If the region is accepted, the binary image file is optionally saved to the hard disk drive 77 or to a floppy diskette via the floppy drive 79. If the region is rejected, the endoscopist can either make another attempt at a manual outlining, or perform an automatic outlining, described above.

Once the node(s) are outlined, the texture of the outlined portion(s) are analyzed, at task 108. Using an Olympus model EU-M2 (or EU-M3 or EU-M20) ultrasound center and an Olympus model GF-UM3 (or GF-UM20) endoscope, and collecting images using the following parameters—a frequency of 12 MHz, a contrast of 5, a gain of 8, and a range of 9 cm—the textural features of interest are the difference entropy textural feature and the correlation textural feature. These textural features are derived from Haralick's difference entropy and correlation textural features, but have been modified for the irregular outlines of the nodes, still retaining the essence of each textural analysis. Although these two textural features are preferred using the above-described configuration, other textural features might be significant with a different configuration or different equipment and are intended to be included within the present invention. For example, a multivariate analysis of two totally different textural parameters might also provide a statistically significant value determinative of N stage.

In Haralick's method, a number of textural features are derived for an image window (square or rectangular section of an image). The features are obtained from a set of gray-tone spatial-dependence probability-distribution matrices (co-occurrence matrices), and they quantify textural characteristics such as homogeneity, and contrast. The features can be measured over four directions—0°, 45°, 90°, and 135°—and averaged to provide some degree of rotational invariance.

Prior to the computation of the gray-tone spatial-dependence matrices, the gray levels present in the image window are quantized to compensate for effects such as luminance and to reduce the total number of gray levels present. In the present invention, such quantization attempts to eliminate the impact of different EUS control settings. An equal-probability quantizing algorithm is used. Briefly stated, the equal-probability quantizing algorithm essentially divides the cumulative probability distribution function of the gray levels (p(gl)) in an image (histogram) into K segments with equal fractions of the $$\left(\frac{1}{K}\right).$$

The gray levels (gl) which have the closest possible values of p(gl) that allows the segmentation of p(gl) into K segments with equal probabilities are then defined as the least upper boundaries for every Kth quantized gray level.

Each entry in a spatial-dependence matrix reflects the total number of occurrences of neighboring pixels with determined quantized gray levels that are separated by a fixed distance over a specific direction. An 8-pixel neighborhood model is used. The equation below shows how to obtain the spatial-dependence matrix for the pixels separated by a distance d over direction 0° contained in a window Y×X (Y rows, and X columns).

$$P(i, j, d, 0°) = \#[((k, l), (m, n)) \in (Y \times X) |$$

$$k - m = 0, |l - n| = d, I(k, l) = i; I(m, n) = j]$$

where P(i, j, d, 0°) is the matrix entry for row i, and column j, and I(k, l) is the gray level value of pixel in the window Y×X located at row k, and column l. The calculation of spatial-dependence matrices can be better understood by examining the example below:

| 0 | 0 | 1 | 1 |
|---|---|---|---|
| 0 | 0 | 1 | 1 |
| 0 | 2 | 2 | 2 |
| 2 | 2 | 3 | 3 |

|   | 0 | 1 | 2 | 3 |
|---|---|---|---|---|
| 0 | #(0, 0) | #(0, 1) | #(0, 2) | #(0, 3) |
| 1 | #(1, 0) | #(1, 1) | #(1, 2) | #(1, 3) |
| 2 | #(2, 0) | #(2, 1) | #(2, 2) | #(2, 3) |
| 3 | #(3, 0) | #(3, 1) | #(3, 2) | #(3, 3) |

$$P_0^a = \begin{pmatrix} 4 & 2 & 1 & 0 \\ 2 & 4 & 0 & 0 \\ 1 & 0 & 6 & 1 \\ 0 & 0 & 1 & 2 \end{pmatrix} \quad P_{45}^a = \begin{pmatrix} 4 & 2 & 0 & 0 \\ 1 & 2 & 2 & 0 \\ 0 & 2 & 4 & 1 \\ 0 & 0 & 1 & 0 \end{pmatrix}$$

$$P_{90}^a = \begin{pmatrix} 6 & 0 & 2 & 0 \\ 0 & 4 & 2 & 0 \\ 2 & 2 & 2 & 2 \\ 0 & 0 & 2 & 0 \end{pmatrix} \quad P_{135}^a = \begin{pmatrix} 2 & 1 & 3 & 0 \\ 1 & 2 & 1 & 0 \\ 3 & 1 & 0 & 2 \\ 0 & 0 & 2 & 0 \end{pmatrix}$$

In the above example, the distance 1 spatial-dependence matrices $P_{0°}, \ldots, P_{135°}$ were calculated for the 4×4 window shown on the top left figure, above. The top right figure explains the meaning of each entry of a spatial-dependence matrix. For example, the entry # (0×0) is the number of times in the 4×4 window that a pixel with quantized gray level of 0 is adjacent to another pixel with quantized gray level of 0 over a specific direction.

Also, prior to the calculation of the textural features, the spatial-dependence matrices are normalized for the total number of neighboring pixels along each of the four directions. For the rectangular window Y×X, the normalization factors are given by the following equations:

$R_{0°} = 2(N_x - 1)N_y$ $R_{90°} = 2(N_y - 1)N_x$ $R_{45°} = 2(N_y - 1)(N_x - 1)$ $R_{135°} = 2(N_x - 1)(N_y - 1)$ where $R_{0°}, \ldots, R_{135°}$ are the normalization factors for all four directions, $N_x$ is the number of columns in the window, and $N_y$ is the number of rows in the window.

The entries of the normalized spatial-dependence matrices are given by the following equation:

$$p(i, j) = \frac{P(i, j)}{R}$$

where p(i, j) is the (i, j)th entry of the normalized spatial-dependence matrix, P(i,j) is the (i,j)th entry of the spatial-dependence matrix prior to normalization, and R is the normalization factor along a specific direction (0°, 45°, 90°, or 135°).

All textural features are derived either from normalized versions of the spatial-dependence matrices, or from the marginal-probability matrices. The marginal-probability matrices $p_x, p_y, p_{x+y}$, and $P_{x-y}$ are determined from the following equations:

$$p_x(i) = \sum_{j=1}^{N_g} p(i, j)$$

$$p_y(j) = \sum_{i=1}^{N_g} p(i, j)$$

$$p_{x+y}(k) = \sum_{i+j=k} p(i, j), k = 2, 3, \ldots, 2N_g$$

$$p_{x-y}(k) = \sum_{|i-j|=k} p(i, j), k = 0, 1, \ldots, N_g - 1$$

where $p_x(i)$ is the row marginal-probability matrix, $p_y(j)$ is the column marginal-probability matrix, $P_{x+y}$ is the sum marginal-probability matrix, and $p_{x-y}$ is the difference marginal-probability matrix.

To apply such algorithms to a region which was invariably not a perfect square, as in the case of the regions 28', 30' corresponding to lymph nodes 28, 30, an adaptation is required. Two methods can be employed, and in both methods the values of each textural feature are averaged over the four directions (0°, 45°, 90° and 135°) to obtain a mean value that is the final measurement used for that specific textural feature.

As described below, two different textural analysis methods are used. In the first textural analysis method, the input parameters used for Haralick's analyses are: 1 pixel distance and 16 quantized gray levels. In the second textural analysis method, the input parameters used for Haralick's analyses are: 3 pixel distance and 20 quantized gray levels. The parameters for the second textural method appear to be optimal. Some tests were performed before the fourth patient was included in the validation study, which is described below in connection with the validation of the present invention. The pixel distance parameter was varied form 1 to 3. A pixel distance value of 4 was also attempted, but caused problems with the computations of textural features for the smaller nodes. Very few neighboring pairs of pixels could be used when such a relatively large pixel distance value was used, because some imaged lymph nodes can be very small, with cross-sectional area dimensions on the order of 40 pixels. Using pixel distance values ranging from 1–3, the value that yielded best overall p-values for Haralick's features for the same value of quantized gray levels was 3.

The choice of 20 quantized gray levels was made after inspection of a histogram from a sample of 10×10 windows taken from some digital lymph node images. It was observed that the vast majority of windows normally had more than a certain number of gray levels. Maintaining the same number of quantized gray levels is important, because textural features are clearly dependent on the dimensions of the co-occurrence matrices. In addition, it is important to try to keep a great amount of detail of information originally present in the gray level distribution. Quantization to a very small number of gray levels makes the task of finding differences between malignant and benign nodes more difficult. For the study summarized below in connection with a discussion of validity of the present invention as a diagnostic tool, the parameters of Haralick's analysis were not varied in an attempt to optimize performance due to the limitations of the data set, which might further enhance the present invention. Specifically, three potential values of gray scale quantization were analyzed: 20 levels, 25 levels, and 32 levels. The selection balanced preserving detail of the echopattern with the smaller number of present gray levels in the smaller nodes. The number of 20 quantized gray levels could be applied to all lymph nodes, with the exception of only several frames from a couple of nodes. With this value, the necessary standardization of the spatial-dependence matrices dimensions was achieved.

Figure 6:
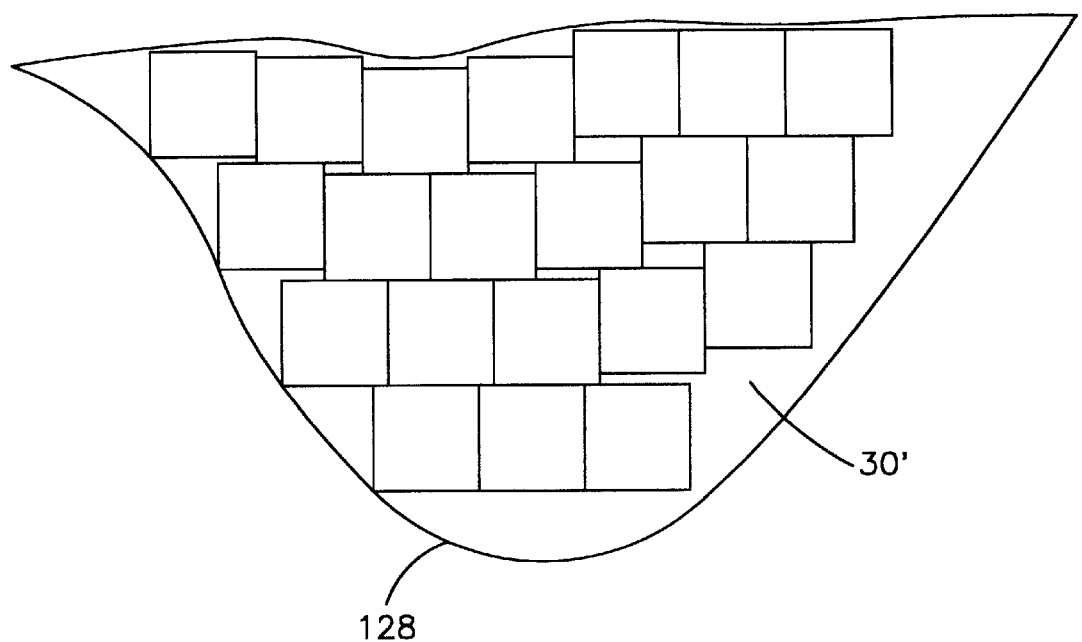
FIG. 6 is a line drawing showing an exemplary node filled with square windows that facilitate textural analysis of the node.

The first textural analysis method consists of fitting a series of small square windows, typically 10×10 pixels, within the lymph node region defined by the outline 123, 128 determined in task 106. A window size of 10×10 was selected to maximize the total area of the node and of the tumor used for the computations of the textural features. Also, the window must have dimensions that are larger than axial and lateral resolutions (approximately 1, and 5 pixels respectively). On the other hand, a smaller window size is desirable to allow the maximum area of the lymph node to be used utilized in the analysis. A 10×10 window is one compromise of these competing factors; thus, each node is filled with many windows having a size of 10×10 pixels. This is exemplified in FIG. 6 in which 21 small squares (whose sides are vertical and whose top and bottom are horizontal) are mapped into the region 30' starting in a corner and then sequentially placing squares so that the next square has two sides or corners that coincide with either a placed square or the border 128. No portion of any placed square lies outside the determined region 123, 128. Haralick's standard 14 textural analysis algorithms are then applied for all fitted windows. The values obtained for each textural feature are averaged over all placed windows to produce final (average) values which are the values actually attributed to that node echopattern characteristics. Haralick's algorithms for all 14 textural features are known to those skilled in the art. Additionally, software programs for determining all 14 values are available from numerous sources. For example, although not geared toward a production or real-time mode of processing, routines from the Khoros program (originally developed at the University of New Mexico and currently available from Khoral: http://www.khoral.com) and the PBM Plus software (available from the Texas Agricultural Experimental Station) can be used to implement both textural analysis methods. As mentioned above, using an Olympus model EU-M2 (or EU-M3 or EU-M20) ultrasound center and an Olympus model GF-UM3 (or GF-UM20) endoscope, and collecting images using a frequency of 12 MHz, a contrast of 5, a gain of 8, and a range of 9 cm, the textural features of interest are the difference entropy textural feature and a correlation textural feature; however, using different equipment or different settings on the same equipment, other textural features might be determinative of N stage.

The second textural analysis method uses the lymph node outline 123, 128 in the binary image (that was determined at task 106) as a mask. In this second method, the normalization factors R and the first 11 textural feature values below are determined using all points within the node boundaries 123, 128. This alteration to the original concept developed by Haralick does not affect its essence by any means. In addition, it is conceptually more correct because all points pertaining to the lymph node interior are used in the computation of the textural features. In both methods, Haralick's textural features are determined using the following equations:

$$ASM = \sum_{i=1}^{N_g} \sum_{j=1}^{N_g} (p(i,j))^2$$

$$CONT = \sum_{n=0}^{N_g-1} n^2 \left( \sum_{|i-j|=0} (p(i,j)) \right)$$

$$CORR = \frac{\sum_i \sum_j (ij)p(i,j) - \mu_x \mu_y}{\sigma_x \sigma_y}$$

$$VAR = \sum_i \sum_j (i-\mu)^2 p(i,j)$$

$$IDM = \sum_i \sum_j \frac{1}{1+(i-j)^2} p(i,j)$$

$$SUMAVG = \sum_{i=2}^{2N_g} i\, p_{x+y}(i)$$

$$SUMVAR = \sum_{i=2}^{2N_g} (i - \mu_{x+y})^2 p_{x+y}(i)$$

$$SUMENT = -\sum_{i=2}^{2N_g} p_{x+y}(i)\log(p_{x+y}(i))$$

$$ENT = -\sum_i \sum_j p(i,j)\log(p(i,j))$$

$$DIFFVAR = \sum_{i=0}^{N_g-1} (i - \mu_{x-y})^2 p_{x-y}(i)$$

$$DIFFENT = -\sum_{i=0}^{N_g-1} p_{x-y}(i)\log(p_{x-y}(i))$$

$$HXY1 = -\sum_i \sum_j p(i,j)\log(p_x(i)p_y(j))$$

$$MEASCORR1 = \frac{HXY - HY1}{\max(HX, HY)}$$

$$HXY = -\sum_i \sum_j p(i,j)\log[p(i,j)]$$

$$HX = -\sum_i \sum_j p_x(i)\log[p_x(i)]$$

$$HY = -\sum_i \sum_j p_y(j)\log[p_y(j)]$$

$$HXY2 = -\sum_i \sum_j p_x(i)p_y(j)\log(p_x(i)p_y(j))$$

$$MEASCORR2 = (1 - \exp[-2.0(HXY2 - HXY)])^{\frac{1}{2}}$$

$$Q(i,j) = \sum_k \frac{p(i,k)p(j,k)}{p_x(i)p_y(k)}$$

$$MAXXCORR = (2^{nd} \text{ largest eigenvalue of } Q)^{1/2}$$

where $\sum_i = \sum_{i=0}^{N_g}$, $\sum_j = \sum_{j=o}^{N_g}$, $\sum_k = \sum_{k=o}^{N_g}$, $\sum_{|i-j|=0}$, $= \sum_{i=0}^{N_g} \sum_{j=0}^{N_g}$ for $n = |i - j|$, $N_g$ is the number of quantized gray levels, p(i,j) is (i,j)th entry in a normalized spatial-dependence matrix along a specific direction (0°, 45°, 90° or 135°), $\mu, \mu_x, \mu_y, \mu_{x+y}, \mu_{x-y}, \sigma_x,$ and $\sigma_y$ are the means, and standard deviations of p, $p_x, p_y, p_{x+y},$ and $p_{-y}$, respectively, and HX, HY, and HXY are the entropies of $p_x, p_y$ and p.

Although the above equations are used in both methods, they are necessarily applied differently to the digital images because of the differences between the two methods. In the first method (10 pixel by 10 pixel squares filling a majority of the node) the equations are applied individually to all the square windows filling the node and the fourteen values for all the square windows for every view of that node are averaged, which results in fourteen averaged textural analysis values for each node. In the second method (the masked node analyzed as one region with the node region having its gray scale values and the other part of the image having an intensity of zero), exactly the same equations are applied to the masked node image as a whole, considering all pixels within the node having at least one pixel within the specified pixel distance (in this case, 3) away. No mask other than the binary node image 120, 124 is used and no rectangle is fit inside or around the node.

The textural features listed above identify different image characteristics, such as homogeneity, contrast, presence of organized structures in the image, and complexity and nature of gray level transitions. It is often difficult to clearly recognize what texture characteristic corresponds to each textural feature. Even more difficult is the task of translating what the textural features measure in terms of what the human eye can see. For instance, the ASM (angular second moment) value is a measure of homogeneity. The equation for ASM above shows that as the number of gray levels present in the image increase, the number of entries in the spatial-dependence matrix also increases. The fewer the number of dominant entries in the matrix, the smaller the final sum of their squares. The ASM value lies somewhere between 0 for very low homogeneity, and 1 for very high homogeneity. The CONT (contrast) value corresponds to the contrast textural feature and reflects the amount of local variations, or contrast, in the analyzed region. As can be seen from the CONT equation above, entries from the main diagonal of the spatial-dependence matrix, i.e., entries which relate to pairs of neighboring pixels with equal quantized gray levels, give no contribution whatsoever to the final value of CONT as n equals 0. The higher the difference between neighboring pixels, the higher the value of n, and the greater the contribution to the final value of CONT.

The CORR (correlation) value corresponds to the correlation textural feature and measures the amount of gray-tone linear dependencies in the image. The higher the presence of linear structures in the image, the higher the value of CORR. One should expect high values of CORR in images where human perception can identify types of repetitive linear patterns. The MEASCORR1, MEASCORR2 (information measures of correlation 1 and 2), and MAXCORR (maximal correlation coefficient) values are also measures of correlation, and should be sensitive to other types of correlated structures present in an image other than lines. Because of its disadvantage of not converging all the time, the MAXCORR value cannot always be used as an analysis tool.

The VAR (variance), SUMVAR (sum variance), and DIFVAR (difference variance) values correspond to the variance, sum variance, and difference variance textural features and measure variations present in the image using the spatial-dependence matrices and some of the marginal-probability matrices. These values may be in some way be correlated to each other and also to the CONT (contrast) value, because they attempt to measure similar properties. The ENT (entropy), SUMENT (sum entropy), and DIFFENT (difference entropy) values correspond to the entropy, sum entropy, and difference entropy textural features and measure the entropy, or amount of information present in the image using three different matrices. These values vary directly with the complexity of the image. The higher the number of gray levels present in the image, the higher is the amount of information, or complexity present in the image, and the higher is the entropy value.

As a comparison of their equations reveals, it seems likely that entropy measurements should be inversely related to correlation measurements. This is because the presence of highly correlated gray-tone transitions in an image diminish the total amount of information, or entropy of that image.

Additionally, several other quantitative analyses of the node regions can be performed, e.g., an analysis of the shape of the node, a statistical analysis of the intensities in the node region of the ultrasound image, and other textural analyses, such as Laws' method. One quantitative measurement of the shape of a node is its circularity, which can be measured by numerous methods, including measurement by the best-fit ellipse method, and by the distances method.

In the best-fit ellipse method of determining circularity, the final measurement used to express circularity is the ratio (a/b) between major (a) and minor (b) axes of an ellipse fitted around the area of the lymph node as defined by the region 123, 128 in the binary image 120, 124 of the node. Parameters of the best-fit ellipse such as length of major and minor axes, and orientation are calculated based on moments. First, the coordinates of the center of mass for the node region 28', 30' (including the outlines 123, 128) are obtained by calculating the first order moments from the following equations:

$$x_{cm} = \frac{1}{N} \sum_{(x,y) \in R} x$$

$$y_{cm} = \frac{1}{N} \sum_{(x,y) \in R} y$$

where $y_{cm}$ is the center of mass row, $x_{cm}$ is the center of mass column, N is the total number of pixels in region R (in this case, the lymph node area), and $\Sigma_{(x,y) \in R}$ is the sum over all points with coordinates x and y pertaining to region R. The (p,q) order central moments $m_{p,q}$ can be calculated using the following equation:

$$m_{p,q} = \sum_{(x,y) \in R} (x - x_{cm})^p (y - y_{cm})^q$$

The orientation θ of region R which is the angle of the axis of the least moment of inertia is given by the following equation:

$$\theta = \frac{1}{2} \arctan\left(\frac{2m_{1,1}}{m_{2,0} - m_{0,2}}\right)$$

The best-fit ellipse is the ellipse whose second order moments are equal to those of the object. The least and greatest moments of inertia of the ellipse are given by the following equations:

$$I_{min} = \frac{\pi}{4} a b^3$$

$$I_{max} = \frac{\pi}{4} a^3 b$$

where a is the semimajor axis and b is the semiminor axis of the ellipse. The moments of inertia above can be calculated for the object with orientation θ using the following equations:

$$I'_{min} = \sum_{(x,y)\in R} [(y-y_{cm})\cos\theta - (x-x_{cm})\sin\theta]^2$$

$$I'_{max} = \sum_{(x,y)\in R} [(y-y_{cm})\sin\theta + (x-x_{cm})\cos\theta]^2$$

The conditions that $I_{min}=I'_{min}$ and $I_{max}=I'_{max}$ must hold for the best-fit ellipse, which leads to the following equations:

$$a = \left(\frac{4}{\pi}\right)^{\frac{1}{4}} \left[\frac{(I'_{max})^3}{I'_{min}}\right]^{\frac{1}{8}}$$

$$b = \left(\frac{4}{\pi}\right)^{\frac{1}{4}} \left[\frac{(I'_{min})^3}{I'_{max}}\right]^{\frac{1}{8}}$$

The best-fit ellipse is rotation and size invariant. The ratio a/b has a minimum value of 1.0 that is obtained for a perfectly circular object. Its value increases according to the degree of elongation of the object. The ratio a/b is a good measurement of the overall roundness of the object in question and is quite insensitive for small changes on the outline of the object.

In the distances method of determining circularity, the final measurement obtained is the ratio ($\mu_R/\sigma_R$) between the mean value of the distances from the center of mass to all contour points ($\mu_R$) and the standard deviation of the distances calculated for all contour points ($\sigma_R$). The input image used in this case is the binary image 120, 124 containing the lymph node outline 123, 128. The center of mass coordinates of the regions 28', 30' (including the outlines 123, 128) are once again obtained using the method of moments equations:

$$x_{cm} = \frac{1}{N} \sum_{(x,y)\in R} x$$

$$y_{cm} = \frac{1}{N} \sum_{(x,y)\in R} y$$

The mean distance and the variance of the distances can then be obtained from the following equations:

$$\mu_R = \frac{1}{K} \sum_{k=0}^{K-1} \|(x_k, y_k) - (x_{cm}, y_{cm})\|$$

$$\sigma_R^2 = \frac{1}{K} \sum_{k=0}^{K-1} [\|(x_k, y_k) - (x_{cm}, y_{cm})\| - \mu_R]^2$$

where $\mu_r$ is the mean distance value, $\sigma_R^2$ is the variance of the distances, $y_k$ is the boundary pixel row, $x_k$ is the boundary pixel column, $y_{cm}$ is the center of mass row, and $x_{cm}$ is the center of mass column. The ratio $\mu_R/\sigma_R$ is the final measure and is orientation and area independent. Its value increases monotonically as the shape 28', 30' becomes more circular. The ratio $\mu_R/\sigma_R$ is sensitive not only to the overall roundness of the object but also to the degree of regularity of the boundary.

A statistical analysis of the intensities in the node region of the ultrasound image can include an analysis of statistical parameters such as mean ($\mu_A$) and standard deviation ($\sigma_A$), which are derived for the gray level intensity distribution of the object interior 28', 30'. The outlined object area binary image 120, 124 is utilized as a mask on the original digitized EUS image so that only the exact points pertaining to the lymph node interior are used in the calculation of the statistical variables. Such statistical calculations are known to those skilled in the art. Another statistical parameter that can be derived from this operation is the so-called signal-to-noise ratio (SNR) of the lymph node interior. The SNR of a region has been often reported as a useful first-order statistic of texture, and is calculated using the following equation:

$$SNR = \frac{\mu_A}{\sigma_A}$$

where $\mu_A$ is the mean pixel intensity level within the outlined area of the lymph node 123, 128, and $\sigma_A$ is the standard deviation of the intensity levels within the same area.

An alternative or addition to Haralick's textural analyses is Laws' method, which analyzes "texture energy" of an image. Initially, the image is convolved with a set of typically 5×5 filter masks (known as kernels) which are designed to measure the image content of specific features such as edges, and spots. For each of the kernels used in this first convolution step, a new image is produced. All 5×5 filter masks are derived by multiplying two of the five basic center-weighted vectors which are shown in the following equations:

L5=[1 4 6 4 1]

E5=[-1 -2 0 2 1]

S5=[-1 0 2 0 -1]

W5=[-1 2 0 -2 1]

R5=[1 -4 6 -4 1]

In these equations the L5 vector is related to luminance, the E5 vector is related to edges, the S5 vector is related to spots, the W5 vector is related to waves, and the R5 vector is related to ripples. The multiplication of different pairs of vectors produces filters that measure different characteristics of the image. A pair of filters that is produced by the multiplication of the same pair of vectors, only with different order of the operands, measure the same type of image characteristic. However, the filters differ in the orientation to which they are sensitive for the presence of that specific characteristic. For instance, L5E5, and E5L5 both measure edge content. The former is sensitive to vertical edge content, and the latter to horizontal edge content.

The new images resulting from the first convolving step for each of the masks are then further convolved with an absolute average filter that replaces each pixel value by the average of the absolute gray level values of pixels within a small neighborhood centered over that specific pixel. The resulting image of this two step operation is called a "texture energy" image. For example, a 9×9 absolute averaging filter can be described by the following equation:

$$E(i, j) = \sum_{i=-4}^{4} \sum_{j=-4}^{4} |F(i, j)|$$

where i is the row, j is the column, E(i,j) is the (i,j)th pixel value of the "texture energy" image, and F(i,j) is the (i,j)th pixel value of the original image filtered by an specific mask.

This approach of measuring local "texture energy" by the sum of absolute values in a small window of the filtered image is similar to a local standard deviation if the filtered image is zero-mean. This is the case for all filter masks, except L5L5 which can be used with an optional step of normalization.

Once the "texture energy" images are obtained, three additional optional operations can be performed: normalization for luminance and contrast, rotational averaging, and extraction of principal components. The normalization step, which eliminates the need for histogram-equalization, seems to be of value in cases where the EUS control settings are not fixed. When EUS control settings are fixed, normalization is not needed. Normalization can be obtained by subtracting the local measure of luminance from the "texture energy" images, or by dividing the "texture energy" images by the local measure of contrast. These local measures can be calculated by convolving the image with filter L5L5, and then using an averaging filter to obtain local mean (for the case of luminance), and local standard deviation (for the case of contrast). One way of making Laws' method rotationally invariant is by combining two "texture energy" images produced by kernels sensitive to similar features oriented in two perpendicular directions. The "texture energy" images from matched pairs of textural measures are then simply added. For example, the resulting image from the addition of the "texture energy" images produced by the L5E5-E5L5 pair measure total edge content.

The specific 5×5 kernels used are known to be the most important of Laws' basic filters and are set forth below:

$$E5L5 = \begin{bmatrix} -1 & -4 & -6 & -4 & -1 \\ -2 & -8 & -12 & -8 & -2 \\ 0 & 0 & 0 & 0 & 0 \\ -2 & -8 & -12 & -8 & -2 \\ -1 & -4 & -6 & -4 & -1 \end{bmatrix}$$

$$R5R5 = \begin{bmatrix} 1 & -4 & 6 & -4 & 1 \\ -4 & 16 & -24 & 16 & -4 \\ 6 & -24 & 36 & -24 & 6 \\ -4 & 16 & -24 & 16 & -4 \\ 1 & -4 & 6 & -4 & 1 \end{bmatrix}$$

$$E5S5 = \begin{bmatrix} -1 & 0 & 2 & 0 & -1 \\ -2 & 0 & 4 & 0 & -2 \\ 0 & 0 & 0 & 0 & 0 \\ 2 & 0 & -4 & 0 & 2 \\ 1 & 0 & -2 & 0 & 1 \end{bmatrix} \quad L5S5 = \begin{bmatrix} -1 & 0 & 2 & 0 & -1 \\ -4 & 0 & 8 & 0 & -4 \\ -6 & 0 & 12 & 0 & -6 \\ -4 & 0 & 8 & 0 & -4 \\ -1 & 0 & 2 & 0 & -1 \end{bmatrix}$$

In addition, the L5E5, S5E5, and S5L5 kernels, which are oriented perpendicular to E5L5, E5S5, and L5S5, respectively, are used to provide rotational invariance.

Different methods can be applied to "texture energy" images to extract numerical values associated with textural features. The preferred method consists of obtaining statistical parameters such as mean and standard deviation for the combined "texture images." To derive these values, two approaches are used. In the first approach, the same method described in the section related to statistical analysis is used to calculate mean and standard deviation of the gray level distributions present in each "texture energy" image. In the second approach, a series of square windows are fitted within the "texture energy" images using the same method mentioned in the text accompanying FIG. 6 relating to use of Haralick's analysis. The mean pixel value is calculated for each window and the distribution of mean values is then statistically analyzed, with the final output values being: mean, standard deviation, and range of the distribution.

In the various studies performed to develop the present invention and to verify the usefulness of the present invention as a diagnostic tool, the shape measurements (best-fit ellipse and distances), statistical measurements, and Laws' measurements did not yield values that alone are statistically significant with respect to node staging. However, with different imaging equipment (e.g., higher resolution EUS) or in combination with other parameters, these quantitative analyses of an ultrasound image of a lymph node might prove useful in node staging.

Having determined and averaged the textural parameters of interest (and/or other quantitative parameters of interest), the size of the node region(s) 123, 128 is determined, at 110. With a two-dimensional matrix of values, as results from using EUS, the size of interest is the cross-sectional area of the node region(s) 123, 128. Preferably, the cross-sectional area of the node is determined using the outline binary image determined in task 106. That is, the size of the lymph node is determined by a routine that merely counts the total number of pixels contained in each region 123, 128 determined in step 106. It is more appropriate for the area measurement to be expressed in terms of $cm^2$ or $mm^2$. To convert the measurement in pixels to $cm^2$, the total number of pixels contained in the outlined area were divided by the total number of pixels contained within 1 $cm^2$. The area of 1 $cm^2$ in terms of number of pixels is dependent on the range adopted due to the zooming effect of the controls of the EUS center 12. To determine the conversion factor, the marks in digital ultrasound images indicating 1 cm can be used. Using these marks, a square with 1 cm sides was created using a common graphics program; thus the created box has an area of 1 $cm^2$. The area of the box was then determined in terms of number of pixels. Using a range setting of 9 cm, which was used throughout the in vitro imaging of human lymph nodes, a 1 cm square on a digital ultrasound image has approximately 2438 pixels. Thus, using a range setting of 9 cm, a pixel is approximately a square of area 0.04 $mm^2$ (sides of 0.2 mm). Using this conversion factor, the area of the node in pixels is converted to $mm^2$.

Tasks 102–110 are preferably performed a number of times for each lymph node, e.g., a minimum of four images from different angles for each node. That is, a minimum of four different ultrasound images of the same lymph node are acquired), digitized, outlined, and analyzed. The four ultrasound images are preferably acquired with the longitudinal axis of the endoscope being at different angles with respect to the longitudinal axis of the esophagus. The resulting four difference entropy, correlation, and area values are then averaged to arrive at composite difference entropy, correlation, and area values for each lymph node.

Tasks 108 and 110 are shown in FIG. 4 as being performed in a particular order. The analyses of tasks 108 and 110 need not be done in any particular order, just as none of the particular discrete analyses need be done in any particular order. It might be simpler to determine the size (e.g., cross-sectional area) of the node immediately after determining the node outline in task 106.

Next, at task 112, the determined (e.g., composite) values are compared to predetermined reference values to determine the node stage. Preferably, this takes the form of comparing the determined values to a normal distribution of empirical data to determine a percentage rating or the node stage from the determined value. This percentage value or node stage is then displayed on the video display terminal 69 or on another display. A lookup table or any other common means of comparing a determined value to predetermined reference values can be used. For example, if the determined CORR (correlation) value is 31.2, the DIFFENT (difference entropy) value is 2.76, and the size of the node region is 19.1 mm$^2$, the lookup table might, hypothetically, indicate a 95% probability that the node is malignant, which would be displayed on the display 69 or other display. As another example, if the determined CORR value is 33.6, the DIFFENT value is 2.62, and the area of the node region is 14.8 mm$^2$, the lookup table might, hypothetically, indicate a 55% probability that the node is malignant, which would be displayed on the display 69 or other display. In response to this last probability, the endoscopist might begin the node classification process again at task 102 by acquiring a new set of ultrasound images of the node to see if a different set of views of the node give a clearer indication of metastasis or not. Currently, no detailed lookup table described above has been derived; however, one of ordinary skill in the art can derive such a table. Moreover, one skilled in the art can use the table of values for all 68 nodes in the validation study (set forth below in Table I), mean and values from Table II, below, and variance values derived from Table I to determine the node stage and a confidence value for that determination.

An alternative method for classifying nodes that is potentially more powerful is to utilize multiple features, such as size, shape, first-order intensity statistics, and textural measures, in a multi-feature classifier. This technique is sometimes referred to as multi-spectral analysis. The general approach of these classifier methods is to use many features, which may have varying predictive value, to arrive at a single classification. Classically, measured values for each feature resulted in a known classification, and no understanding of the behavior or of each feature is required. Conversely, the weights assigned in fuzzy logic schemes are determined based on some fundamental property of the object or a statistical measure of the feature's behavior. As applied to the present invention, a multi-spectral analysi can be implemented by inputting two or more of the determined features, such as size, shape, first-order intensity statistics, and textural measures, etc., into a suitable processor, such as a trained artificial neural network, a fuzzy logic processor, etc., which determines the node stage from the plurality of values.

The routines of the node classifier of the present invention were validated in a study of 68 lymph nodes (49 benign, 19 malignant) harvested from four patients with esophageal carcinoma, none of whom were submitted to radiotherapy or chemotherapy prior to surgery. All of the images were collected using an Olympus model EU-M2 ultrasound center and an Olympus model GF-UM3 endoscope, with the following settings: a frequency of 12 MHz, a contrast of 5, a gain of 8, and a range of 9 cm. Three geometric features (area, a/b, and $\mu_R/\sigma_R$), three first-order statistics for image intensity (mean, standard deviation, and SNR), and all fourteen of Haralick's textural features were determined using conventional computer software for all 68 nodes. Laws' method was not applied to this set of images because a preliminary study indicated limited utility using the chosen equipment. The determined parameters from the validity study for the relevant features only (p<0.05) is set forth in the table below:

TABLE I

| Node ID | Area (mm$^2$) | Difference Entropy | Correlation (×1000) | Pathology |
| --- | --- | --- | --- | --- |
| 1 | 66.47 | 2.22 | 44.37 | Malignant |
| 2 | 4.81 | 2.91 | 28.55 | Malignant |
| 3 | 20.61 | 2.61 | 40.01 | Malignant |
| 4 | 18.68 | 2.43 | 38.32 | Malignant |
| 5 | 32.83 | 2.41 | 41.63 | Malignant |
| 6 | 39.79 | 2.47 | 33.74 | Malignant |
| 7 | 8.66 | 2.52 | 32.19 | Malignant |
| 8 | 10.41 | 2.55 | 34.50 | Malignant |
| 9 | 6.77 | 2.63 | 33.70 | Malignant |
| 10 | 2.14 | 3.08 | 22.46 | Malignant |
| 11 | 3.53 | 1.74 | 26.44 | Malignant |
| 12 | 4.90 | 2.91 | 30.41 | Malignant |
| 13 | 42.48 | 2.40 | 41.48 | Malignant |
| 14 | 25.30 | 2.38 | 40.09 | Malignant |
| 15 | 5.83 | 2.91 | 31.37 | Malignant |
| 16 | 21.00 | 2.41 | 39.70 | Malignant |
| 17 | 14.49 | 2.38 | 38.23 | Malignant |
| 18 | 18.61 | 2.36 | 39.75 | Malignant |
| 19 | 9.85 | 2.58 | 36.02 | Malignant |
| 20 | 39.50 | 2.43 | 35.26 | Benign |
| 21 | 23.79 | 2.42 | 40.88 | Benign |
| 22 | 6.19 | 2.84 | 30.10 | Benign |
| 23 | 37.49 | 2.36 | 41.64 | Benign |
| 24 | 32.94 | 2.22 | 41.24 | Benign |
| 25 | 7.35 | 2.89 | 31.73 | Benign |
| 26 | 8.94 | 2.59 | 34.71 | Benign |
| 27 | 4.12 | 2.85 | 29.69 | Benign |
| 28 | 5.20 | 2.92 | 28.73 | Benign |
| 29 | 4.82 | 2.89 | 31.10 | Benign |
| 30 | 15.02 | 2.45 | 39.72 | Benign |
| 31 | 3.69 | 2.59 | 24.07 | Benign |
| 32 | 3.06 | 2.95 | 25.45 | Benign |
| 33 | 3.60 | 3.03 | 26.29 | Benign |
| 34 | 3.73 | 2.99 | 28.12 | Benign |
| 35 | 1.57 | 2.97 | 19.76 | Benign |
| 36 | 11.89 | 2.64 | 38.30 | Benign |
| 37 | 8.57 | 2.71 | 33.27 | Benign |
| 38 | 23.59 | 2.49 | 39.92 | Benign |
| 39 | 3.85 | 2.87 | 25.49 | Benign |
| 40 | 2.47 | 3.05 | 23.17 | Benign |
| 41 | 13.33 | 2.44 | 38.68 | Benign |
| 42 | 12.82 | 2.50 | 37.38 | Benign |
| 43 | 13.58 | 2.57 | 36.35 | Benign |
| 44 | 15.26 | 2.34 | 40.05 | Benign |
| 45 | 13.79 | 2.55 | 38.47 | Benign |
| 46 | 5.54 | 2.77 | 31.57 | Benign |
| 47 | 9.16 | 2.79 | 27.42 | Benign |
| 48 | 9.34 | 2.68 | 33.10 | Benign |
| 49 | 6.23 | 2.69 | 31.24 | Benign |
| 50 | 11.47 | 2.71 | 36.36 | Benign |
| 51 | 10.72 | 2.60 | 37.71 | Benign |
| 52 | 9.66 | 2.77 | 31.90 | Benign |
| 53 | 19.06 | 2.60 | 39.65 | Benign |
| 54 | 8.75 | 2.68 | 31.84 | Benign |
| 55 | 2.99 | 2.97 | 27.07 | Benign |
| 56 | 16.39 | 2.55 | 31.80 | Benign |
| 57 | 17.87 | 2.55 | 33.05 | Benign |
| 58 | 17.86 | 2.57 | 29.90 | Benign |
| 59 | 6.62 | 2.76 | 30.31 | Benign |
| 60 | 8.29 | 2.61 | 32.18 | Benign |
| 61 | 2.47 | 3.15 | 23.24 | Benign |
| 62 | 9.54 | 2.69 | 29.34 | Benign |
| 63 | 1.65 | 2.20 | 18.77 | Benign |
| 64 | 3.10 | 3.19 | 25.06 | Benign |
| 65 | 3.71 | 3.08 | 26.14 | Benign |
| 66 | 5.62 | 2.94 | 30.64 | Benign |
| 67 | 6.59 | 2.94 | 31.58 | Benign |
| 68 | 10.14 | 2.68 | 33.77 | Benign |

The following table sets forth the results of a univariate analysis of the above data (and several other features not included in the above data) for textural and geometrical features obtained for standard two sided t-tests with 5% level of significance:

TABLE II

| Analysis | Parameter | Mean Value | | p-value |
| --- | --- | --- | --- | --- |
| | | N0 (n = 49) | N1 (n = 19) | |
| Statistical | Mean | 101.1 | 99.4 | 0.865 |
| | SNR | 4.46 | 4.03 | 0.161 |
| Size | Area (mm$^2$) | 10.7 | 18.8 | 0.011 |
| Distances | $\mu_R/\sigma_R$ | 4.02 | 4.40 | 0.210 |
| Best-fit ellipse | a/b | 1.59 | 1.65 | 0.506 |
| Haralick's | Diff. Entropy | 2.71 | 2.52 | 0.008 |
| | Correlation (×1000) | 31.9 | 35.4 | 0.025 |

This table shows that the features that reached statistical significance were area of the node and two of Haralick's textural features, namely difference entropy and correlation. No other textural features were found to be predictive of N stage using the equipment and settings listed herein. In general, malignant nodes tended to be larger than benign nodes. In addition, malignant nodes had lower values for difference entropy and higher values of correlation than the respective values obtained for benign nodes.

Additionally, to assess the effect of pathology, patient (of origin), and the interaction pathology-patient, a two-way anova test for unbalanced data was performed. The following table, TABLE III, shows the results for pathology, patient, and of the pathology-patient pair obtained for the same parameters shown in Table II. The patient effect was found to be statistically significant for most of the features. Of great importance is the fact that for all features found to be predictive of N stage, the interaction patient-pathology was not statistically significant. In other words, the observations made for the effect pathology were not dependent on the parameter patient of origin.

TABLE III

| Parameter | Effect-Pr > F | | |
| --- | --- | --- | --- |
| | Pathology | Patient | Path-Patient |
| Mean | 0.369 | <0.001 | 0.614 |
| SNR | 0.082 | <0.001 | 0.630 |
| Area (mm$^2$) | <0.001 | <0.001 | 0.101 |
| $\mu_R/\sigma_R$ | 0.021 | 0.017 | 0.288 |
| a/b | 0.590 | .250 | .727 |
| Diff. Entropy | 0.25 | 0.145 | 0.064 |
| Correlation | 0.043 | 0.039 | 0.513 |

Since the outlining step was done manually, to validate the results shown in Tables II and III the intraobserver variability should be determined. Table IV shows the results obtained for the intraobserver variabilities estimation for the same features shown in Tables II, and III. Tables IV and V actually represent the data related to 19 lymph nodes. One of the lymph nodes originally picked was in fact the smallest node in the original set of all benign and all malignant nodes. Probably due to its size, its ranges of variation were consistently higher than those of the remaining 19 nodes, and for such reason this specific node was left out of the analysis. As can be seen from Tables II and IV, the intraobserver variabilities for observer 1 and for the average observer were within acceptable range for the features found to be predictive of N stage. Table IV shows the results obtained expressed as a percentage of the mean for the four outlines performed by each observer. In other words, the variations inherently due to the manual outline operation were smaller (from a percentage standpoint) than the differences found between the means of the distributions of malignant and benign nodes for the predictive features.

TABLE IV

| Parameter | Obs1 | Obs2 | Obs3 | Obs4 | AvgObs |
| --- | --- | --- | --- | --- | --- |
| Mean | 5.5 | 7.0 | 8.2 | 9.2 | 7.5 |
| SNR | 12.1 | 13.5 | 15.0 | 22.2 | 15.7 |
| Area | 14.8 | 22.6 | 20.8 | 32.5 | 22.7 |
| $\mu_R/\sigma_R$ | 18.6 | 32.7 | 25.3 | 33.5 | 27.5 |
| a/b | 17.9 | 19.3 | 24.1 | 22.3 | 20.9 |
| Diff. Entropy | 4.2 | 6.1 | 6.7 | 7.2 | 6.1 |
| Correlation | 6.3 | 7.1 | 6.7 | 10.1 | 7.6 |

Also, if one wishes to extend the results obtained for observer 1 to a general observer (whether she or he is an expert or not), the interobserver variability must be evaluated. Table V shows the results obtained expressed as a percentage of the mean for the interobserver variability estimation. The variations were surprisingly low, showing that the interobserver variabilities were also within acceptable range, in the same order of magnitude as those of the intraobserver variabilities.

TABLE V

| Parameter | Obs1,2 | Obs1,3 | Obs1,4 | Obs2,3 | Obs2,4 | Obs3,4 |
| --- | --- | --- | --- | --- | --- | --- |
| Mean | 6.3 | 5.4 | 4.1 | 4.5 | 9.0 | 7.5 |
| SNR | 13.4 | 9.9 | 8.0 | 6.3 | 18.6 | 15.3 |
| Area | 13.9 | 14.5 | 13.0 | 9.9 | 21.9 | 19.8 |
| $\mu_R/\sigma_R$ | 10.6 | 14.2 | 9.1 | 16.0 | 8.9 | 17.1 |
| a/b | 8.5 | 9.0 | 7.0 | 5.7 | 7.2 | 7.2 |
| Diff. Entropy | 2.7 | 3.5 | 3.6 | 3.7 | 5.8 | 5.0 |
| Correlation | 3.7 | 4.6 | 3.5 | 3.2 | 5.4 | 5.5 |

Thus, the routines of the present invention have been validated as a diagnostic tool.

The results shown in Tables II and III suggest that malignant lymph nodes tend to be larger than benign lymph nodes. Brightness of lymph node echopattern was not statistically different for the two groups. Information regarding lymph node echopattern seems to have a major role. Two of Haralick's textural features, namely difference entropy and correlation were statistically significant using these settings on this equipment. From the concept of entropy, one can state that it measures the amount of information in the image. More complex images should have higher values of entropy. Correlation measures the amount of linear dependence in the image. Images in which a certain linear pattern repeats itself periodically will have a higher value of correlation than an image in which the features are less correlated. From these definitions, the data suggests that both textural features may be stating the same fact: benign lymph nodes have less organized, less uniform echopattern than malignant nodes. What exactly each of Haralick's textural features measure is not easy to explain. Even more difficult is the task of translating the characteristics measured by the textural features into what the human eye can see. This validation study is a good example. For example, it appears to be virtually impossible to try to teach a clinician to be able to identify changes in the entropy value in images of lymph nodes.

TABLE VI

| Parameter | Range (% mean) |
|---|---|
| Mean | 35.5 |
| SNR | 42.7 |
| Area | 87.3 |
| $\mu_R/\sigma_R$ | 83.0 |
| a/b | 76.8 |
| Diff. Entropy | 30.5 |
| Correlation | 27.1 |

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, types of processors other than digital processors might be used to perform textural analyses of node regions, e.g., analog neural networks, analog processors, optical processors, etc. As another example, using different equipment or different settings, textural analyses other than those mentioned herein might be significant. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A method for analyzing an ultrasound image of a lymph node to determine the status of the lymph node as being at a particular stage, comprising the steps of:
   (a) converting the ultrasound image into a digital ultrasound image;
   (b) determining a region of the digital ultrasound image corresponding to the lymph node;
   (c) determining at least one arithmetic value related to the texture of at least a portion of the region of the digital ultrasound image corresponding to the lymph node;
   (d) comparing the at least one arithmetic value to at least one predetermined value; and
   (e) determining whether the lymph node is at the particular stage based on the relationship between the at least one arithmetic value and the at least one predetermined value.

2. A method for analyzing an ultrasound image of a lymph node according to claim 1 wherein said step of determining at least one arithmetic value comprises the step of determining at least one arithmetic value related to the organization of the texture of at least a portion of the region of the digital ultrasound image corresponding to the lymph node.

3. A method for analyzing an ultrasound image of a lymph node according to claim 1 wherein said step of determining at least one arithmetic value comprises the step of determining at least one arithmetic value related to the uniformity of the texture of at least a portion of the region of the digital ultrasound image corresponding to the lymph node.

4. A method for analyzing an ultrasound image of a lymph node according to claim 1 wherein said step of determining at least one arithmetic value comprises the step of determining a difference entropy value related to a difference entropy textural feature for at least a portion of the region of the digital ultrasound image corresponding to the lymph node.

5. A method for analyzing an ultrasound image of a lymph node according to claim 1 wherein said step of determining at least one arithmetic value comprises the step of determining an entropy value related to an entropy textural feature for at least a portion of the region of the digital ultrasound image corresponding to the lymph node.

6. A method for analyzing an ultrasound image of a lymph node according to claim 1 wherein said step of determining at least one arithmetic value comprises the step of determining a correlation value related to a correlation textural feature for at least a portion of the region of the digital ultrasound image corresponding to the lymph node.

7. A method for analyzing an ultrasound image of a lymph node according to claim 1 wherein said step of determining at least one arithmetic value comprises the step of determining a difference entropy value related to a difference entropy textural feature and a correlation value related to a correlation textural feature for at least a portion of the region of the digital ultrasound image corresponding to the lymph node.

8. A method for analyzing an ultrasound image of a lymph node according to claim 1 further comprising the steps of:
   (a) determining an arithmetic size value related to the size of the region of the digital ultrasound image corresponding to the lymph node;
   (b) comparing the arithmetic size value to at least one predetermined size value; and
   (c) determining whether the lymph node is at the particular stage based on the relationship between the at least one arithmetic value and the at least one predetermined value and the relationship between the arithmetic size value and the at least one redetermined size value.

9. A method for analyzing an ultrasound image of a lymph node according to claim 8 wherein said step of determining an arithmetic size value comprises the step of determining an arithmetic area value related to the area of the region of the digital ultrasound image corresponding to the lymph node.

10. A method for analyzing position-correlated signals of a predetermined parameter of a lymph node to determine the status of the lymph node as being at a particular stage, comprising the steps of:
   (a) gathering position-correlated signals of a predetermined parameter of tissue including a lymph node;
   (b) converting the position-correlated signals of a predetermined parameter of tissue including a lymph node into a matrix of digital parameter data;
   (c) determining a region of the matrix corresponding to the lymph node;
   (d) determining at least one arithmetic value related to the texture of at least a portion of the region of the matrix corresponding to the lymph node;
   (e) comparing the at least one arithmetic value to at least one predetermined value; and
   (f) determining whether the lymph node is at the particular stage based on the relationship between the at least one arithmetic value and the at least one predetermined value.

11. A method for analyzing position-correlated signals of a predetermined parameter of a lymph node according to claim 10 wherein said matrix is a two-dimensional matrix representing position-correlated signals of a predetermined parameter for a slice of tissue.

12. A method for analyzing position-correlated signals of a predetermined parameter of a lymph node according to claim 10 wherein said step of determining at least one arithmetic value comprises the step of determining at least one arithmetic value related to the organization of the texture of at least a portion of the region of the matrix corresponding to the lymph node.

13. A method for analyzing position-correlated signals of a predetermined parameter of a lymph node according to claim 10 wherein said step of determining at least one arithmetic value comprises the step of determining at least one arithmetic value related to the uniformity of the texture of at least a portion of the region of the matrix corresponding to the lymph node.

14. A method for analyzing position-correlated signals of a predetermined parameter of a lymph node according to claim 10 wherein said step of determining at least one arithmetic value comprises the step of determining a difference entropy value related to a difference entropy textural feature for at least a portion of the region of the matrix corresponding to the lymph node.

15. A method for analyzing position-correlated signals of a predetermined parameter of a lymph node according to claim 10 wherein said step of determining at least one arithmetic value comprises the step of determining an entropy value related to an entropy textural feature for at least a portion of the region of the matrix corresponding to the lymph node.

16. A method for analyzing position-correlated signals of a predetermined parameter of a lymph node according to claim 10 wherein said step of determining at least one arithmetic value comprises the step of determining a correlation value related to a correlation textural feature for at least a portion of the region of the matrix corresponding to the lymph node.

17. A method for analyzing position-correlated signals of a predetermined parameter of a lymph node according to claim 10 wherein said step of determining at least one arithmetic value comprises the step of determining a difference entropy value related to a difference entropy textural feature and a correlation value related to a correlation textural feature for at least a portion of the region of the matrix corresponding to the lymph node.

18. A method for analyzing position-correlated signals of a predetermined parameter of a lymph node according to claim 10 further comprising the steps of:
   (a) determining an arithmetic size value related to the size of the region of the matrix corresponding to the lymph node;
   (b) comparing the arithmetic size value to at least one predetermined size value; and
   (c) determining whether the lymph node is at the particular stage based on the relationship between the at least one arithmetic value and the at least one predetermined value and the relationship between the arithmetic size value and the at least one predetermined size value.

19. A method for analyzing an ultrasound image of a lymph node according to claim 18 wherein said step of determining an arithmetic size value comprises the step of determining an arithmetic area value related to the area of the matrix corresponding to the lymph node.

20. Apparatus for analyzing an ultrasound image of a lymph node to determine the status of the lymph node as being at a particular stage, comprising:
   (a) means for converting the ultrasound image into a digital ultrasound image;
   (b) means for determining a region of the digital ultrasound image corresponding to the lymph node;
   (c) means for determining at least one arithmetic value related to the organization of the texture of at least a portion of the region of the digital ultrasound image corresponding to the lymph node;
   (d) means for comparing the at least one arithmetic value to at least one predetermined value; and
   (e) means for determining whether the lymph node is at the particular stage based on the relationship between the at least one arithmetic value and the at least one predetermined value.

21. Apparatus for analyzing an ultrasound image of a lymph node according to claim 20 further comprising:
   (a) means for determining an arithmetic size value related to the size of the region of the digital ultrasound image corresponding to the lymph node;
   (b) means for comparing the arithmetic size value to at least one predetermined size value; and
   (c) means for determining whether the lymph node is at the particular stage based on the relationship between the at least one arithmetic value and the at least one predetermined value and the relationship between the arithmetic size value and the at least one predetermined size value.

22. A node classifier for determining whether a lymph node is at a particular stage, said node classifier to be interfaced to an ultrasound unit outputting an electrical signal corresponding to an ultrasound image of a slice of tissue including the lymph node, said node classifier comprising:
   (a) a processing unit;
   (b) a signal interface in circuit communication with said processing unit, said signal interface receiving the electrical signal from the ultrasound unit, generating a received ultrasound image, and transmitting the received ultrasound image to said processing unit;
   (c) a texture analyzer in circuit communication with said processing unit, said texture analyzer performing a textural analysis by analyzing the organization of the texture of at least one portion of the received ultrasound image corresponding to the lymph node and determining from the textural analysis whether the lymph node is at the particular stage.

23. A node classifier according to claim 22 wherein said texture analyzer comprises code executing on said processing unit.

24. A node classifier according to claim 22 wherein said texture analyzer comprises circuitry in circuit communication with said processing unit.

25. A node classifier according to claim 22 further comprising a region outliner in circuit communication with said processing unit, said region outliner defining a node region of the received ultrasound image corresponding to the lymph node; and wherein said texture analyzer analyzes the organization of the texture of the node region.

26. A node classifier according to claim 22 wherein said texture analyzer analyzes a difference entropy textural feature and a correlation textural feature of said at least one portion of the digital ultrasound image corresponding to the lymph node.

27. A node classifier according to claim 25 wherein said texture analyzer analyzes a difference entropy textural feature and a correlation textural feature of the node region.

28. A computer-readable computer program product including a computer readable medium having computer program logic recorded thereon for enabling a processor in a computer system to determine whether a lymph node is at a particular stage from a digital ultrasound image corresponding to the lymph node, said computer-readable computer program product comprising:
   (a) means for determining a region of the digital ultrasound image corresponding to the lymph node;

(b) means for determining at least one arithmetic value related to the organization of the texture of at least a portion of the region of the digital ultrasound image corresponding to the lymph node;

(c) means for comparing the at least one arithmetic value to at least one predetermined value; and (d) means for determining whether the lymph node is at the particular stage based on the relationship between the at least one arithmetic value and the at least one predetermined value.

29. A said computer-readable computer program product according to claim 28 further comprising:

(a) means for determining an arithmetic size value related to the size of the region of the digital ultrasound image corresponding to the lymph node;

(b) means for comparing the arithmetic size value to at least one predetermined size value; and (c) means for determining whether the lymph node is at the particular stage based on the relationship between the at least one arithmetic value and the at least one predetermined value and the relationship between the arithmetic size value and the at least one predetermined size value.

30. A method of staging lymph nodes comprising the steps of:

(a) acquiring and digitizing an endoscopic ultrasound image of at least one lymph node;

(b) defining a portion of the image that corresponds to the at least one lymph node;

(c) analyzing the textural features of the defined portion of the image that corresponds to the at least one lymph node, wherein this step comprises the steps of:

(1) segmenting the defined portion of the image corresponding to the at least one lymph node into a plurality of pixel matrices;

(2) for each pixel matrix, determining a difference entropy textural feature, a correlation textural feature, and a size value for the lymph node;

(3) comparing the difference entropy textural feature, the correlation textural feature, and the size value for the lymph node to a predetermined reference standard; and (4) determining the stage of the lymph node from the comparison.

* * * * *

UNITED STATES PATENT AND TRADEMARK OFFICE
CERTIFICATE OF CORRECTION

PATENT NO : 6,154,560
DATED : November 28, 2000
INVENTOR(S): Cothren et al.

It is certified that error appears in the above-identified patent and that said Letters Patent is hereby corrected as shown below:

column 11, in spatial-dependence matrix $P_{45}{}^a$, please delete the numeral "2" in the first row and insert --1--.

Signed and Sealed this

First Day of May, 2001

Attest:

NICHOLAS P. GODICI

*Attesting Officer*   *Acting Director of the United States Patent and Trademark Office*